United States Patent [19]
Allen et al.

[11] Patent Number: 5,270,963
[45] Date of Patent: Dec. 14, 1993

[54] METHOD AND APPARATUS FOR PERFORMING NEIGHBORHOOD OPERATIONS ON A PROCESSING PLANE

[75] Inventors: Timothy P. Allen, Palo Alto; Michael F. Wall, Sunnyvale; Federico Faggin, Los Altos Hill, all of Calif.

[73] Assignee: Synaptics, Incorporated, San Jose, Calif.

[21] Appl. No.: 549,423

[22] Filed: Jul. 6, 1990

Related U.S. Application Data

[63] Continuation-in-part of Ser. No. 230,459, Aug. 10, 1988, abandoned.

[51] Int. Cl.$^5$ .............................................. G06G 7/16
[52] U.S. Cl. ..................................... 364/861; 364/807
[58] Field of Search ............... 364/807, 861, 844, 841, 364/825, 602, 606, 757, 760, 767, 754

[56] References Cited

U.S. PATENT DOCUMENTS

| | | | |
|---|---|---|---|
| 4,156,284 | 5/1979 | Engeler | 364/841 |
| 4,161,785 | 7/1979 | Gaspavck | 364/844 |
| 4,464,726 | 8/1984 | Chiang | 364/844 |
| 4,811,270 | 3/1989 | Nash | 364/841 |
| 5,008,833 | 4/1991 | Agranul et al. | 364/807 |
| 5,089,983 | 2/1992 | Chiang | 364/844 |

*Primary Examiner*—Jerry Smith
*Assistant Examiner*—Jim Trammell
*Attorney, Agent, or Firm*—Kenneth D'Alessandro

[57] ABSTRACT

The present invention is a method and apparatus for performing neighborhood processing operations on an n dimensional processing plane. In a simple, two dimensional, example, an M by N processing plane is successively scanned by rows. The output information from each row is presented on column lines. The analog data resulting from a fixed number of successive scans are temporarily held in a multi-stage analog buffer. A computing array is configured to perform the neighborhood operations or other limited co-operand operations on the shifted data. The computing array examines information from a slice made up of selected numbers of successive rows of the entire array, performs the operations on that portion, and provides a series of output signals representative of the result. The analog buffer is pipelined; information from a new row represents only a single row of new data and the contents of the latch stage containing the oldest information is replaced with this new analog data, causing the information from the transducers of the oldest row to be lost. The operation is then performed on the new slice. This sequence is repeated until all representative slices of the total array have had the neighborhood operations performed on them.

19 Claims, 6 Drawing Sheets

METHOD AND APPARATUS FOR PERFORMING NEIGHBORHOOD OPERATIONS ON A PROCESSING PLANE

This application is a continuation-in-part of co-pending application Ser. No. 230,459, filed Aug. 10, 1988, now abandoned. This application is expressly incorporated herein by reference.

BACKGROUND OF THE INVENTION

1. Field Of The Invention

The present invention pertains to a method and apparatus for extracting and processing information from a one or two dimensional array. More particularly, the invention pertains to methods and apparatus for performing neighborhood operations in a one or two dimensional array.

2. The prior Art

Processing of information in a one or two dimensional array, is well-known. There is an ongoing interest in the development of information processing relating to large numbers of transducing or sensing elements. Such elements include visible light, sound input, other sensory input, or even other patterns of signals. There is much current interest in such processing as applied to simulating neural structures such as neural networks.

Many of these applications, such as pattern recognition, sound recognition, and other applications, involve the processing of less than all of the information from a one or two dimensional array. In such instances, the recognition process involves a significant number of "neighborhood operations", i.e., operations which involve the processing of information from one portion of an array. More generally, information processing from an array may involve processing a limited number of co-operands from selected locations in the array.

While such applications are widely varying, a simple example is that of optical pattern recognition in a silicon retina circuit. In the retina example, a two dimensional array of phototransducers produces an electrical current or voltage monotonically related to the light impinging upon the array. The raw data, representing light levels and/or colors at various positions in the array, may be processed in order for some sort of "perception" to take place. Conceptually the simplest method for processing such information would be to integrate the processing circuitry into the array. It is apparent, however, that such a scheme results in an array circuit layout of such complexity that it may not be efficiently realizable as an integrated circuit. Alternatively, the array information could be scanned out into temporary memory storage and then processed, but such schemes utilize substantial amounts of memory and processing time.

In co-pending application Ser. No. 230,459, now abandoned an m by n processing plane is successively scanned by rows. The transducer output information from each row is presented on column lines. The analog data resulting from a fixed number of successive scans are temporarily held in a multi-stage analog shift register. The computing array is configured to perform the neighborhood operations or other limited co-operand operations on the shifted data. The computing array examines information from a slice made up of selected numbers of successive rows of the entire array performs the operations on that portion, and provides a series of output signals representative of the result. The computing array is pipelined; information from a new row is shifted into the computing array, causing the oldest information from the last row in the pipeline row to be lost. In such an arrangement, each of the stored values is copied many times, leading to an inevitable loss of accuracy. The operation is then performed on the new slice. This sequence is repeated until all representative slices of the total array have had the neighborhood operations performed on them. While this arrangement has been shown to represent an improvement over other prior art arrangements, the analog shifting process introduces errors which tend to accumulate with the number of analog shifting operations which are performed.

There is thus a continuing need for improved methods and apparatus for performing neighborhood and other operations on a limited number of co-operands in a multi-dimensional array which do not involve inordinate numbers of hardware components and which do not consume an inordinate amount of processing time.

BRIEF DESCRIPTION OF THE INVENTION

The present invention is an architecture, a method and apparatus for performing neighborhood processing operations on an one or two dimensional processing plane. In a simple, two dimensional, example of a first aspect of the present invention, an M by N processing plane is successively scanned by rows. The transducer output information from each row is presented in analog form on column lines. The analog data resulting from a number of successive row scans equal to the depth of the processing circuitry are placed in a plurality of analog latches arranged in column groups, the number of latches per group being equal to the depth of the processing circuitry. The term analog latch as used herein means any storage element capable of selectively storing an analog value. The latches of each column group have their inputs connected to a column line associated with the column group and their outputs connected to a one or more function circuits. The latches are enabled by a scheme which places the data on the column lines from each newly-scanned row into the latch in each column group containing the oldest data by placing a signal on the enable input of the latch in which the data is to be stored. In this manner, the contents of only one latch per column group at a time is replaced, thus avoiding repeated shifting of data which is still to be used, resulting in a reduction of the opportunity for introduction of errors into the analog data.

In a second aspect of the present invention, the analog data in the latches is processed by, for example, adding or multiplying the data in a preselected group of latches by a set of weighting factors and summing the resultant weighted data. An array of processing circuitry according to the present invention can perform parallel processing operations on a large amount of analog data.

BRIEF DESCRIPTION OF THE DRAWINGS

FIG. 4 is a symbolic representation of the multi neighborhood coverage of the processing circuitry of the circuit of FIG. 3a.

FIG. 5b is a schematic diagram of a function circuit which may be utilized with the voltage to pulse width converter circuit of FIG. 5a.

DETAILED DESCRIPTION OF A PREFERRED EMBODIMENT

Figure 1:
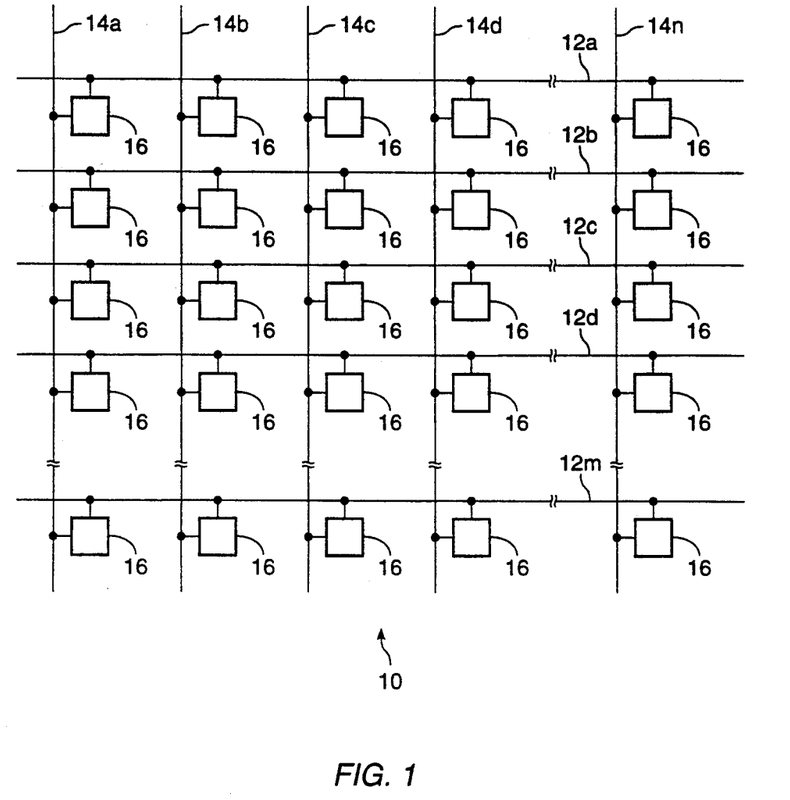
FIG. 1 is a representation of an M×N processing plane useful for providing input data signals to one embodiment of the present invention.

Referring first to FIG. 1, an example of a source of data for the present invention is a processing plane 10 useful for providing input data to the present invention and which may or may not be integrated on the same integrated circuit substrate as the present invention. The processing plane includes an M by N array having row lines 12a through 12m and column lines 14a through 14n. M and N are integers larger than one. At the intersection of each row line 12x and column line 14x, a transducing element or information processing element 16 is located, having an enable input connected to row line 12x and an output connected to column line 14x. Those of ordinary skill in the art will readily recognize that transducing element or information processing element 16 may be one of a wide number of devices, such as an opto-electric transducer or other information processing element.

For the purpose of this disclosure, the phrase "processing plane" means any array of data values stored or generated in such a way that their relative positions are an important semantic element in the computation to be performed. Examples include, but are not limited to CCD or other video cameras, video frame buffers, silicon retinas, auditory auto-correlators and other similar devices.

To extract the information from elements 16 of the array of FIG. 1, the row line corresponding to the row from which the information to be extracted is activated. This may be accomplished by including a select device, such as a select transistor, like those used in memory devices, between the information processing element and the column line, having its gate connected to the row line. When the row line corresponding to the row from which the information to be extracted is activated, the information, in analog form, is placed on column lines 14a, 14b, 14c, 14d, . . . 14n.

Those of ordinary skill in the art will readily recognize that other analog data sources may be used for the present invention. For example, the output of a sound source, sampled at regular intervals, is such a data source.

In a presently preferred embodiment of the invention, each of column lines 14a, 14b, 14c, 14d, . . . 14n, acts as the input line for a multi-stage buffer. The buffer stages connected to each column line may be identical. One such multi-stage buffer will be disclosed herein, and those of ordinary skill in the art will appreciate that the number of such buffers to be included in any particular implementation of the present invention will be a matter of design choice.

Figure 2A:
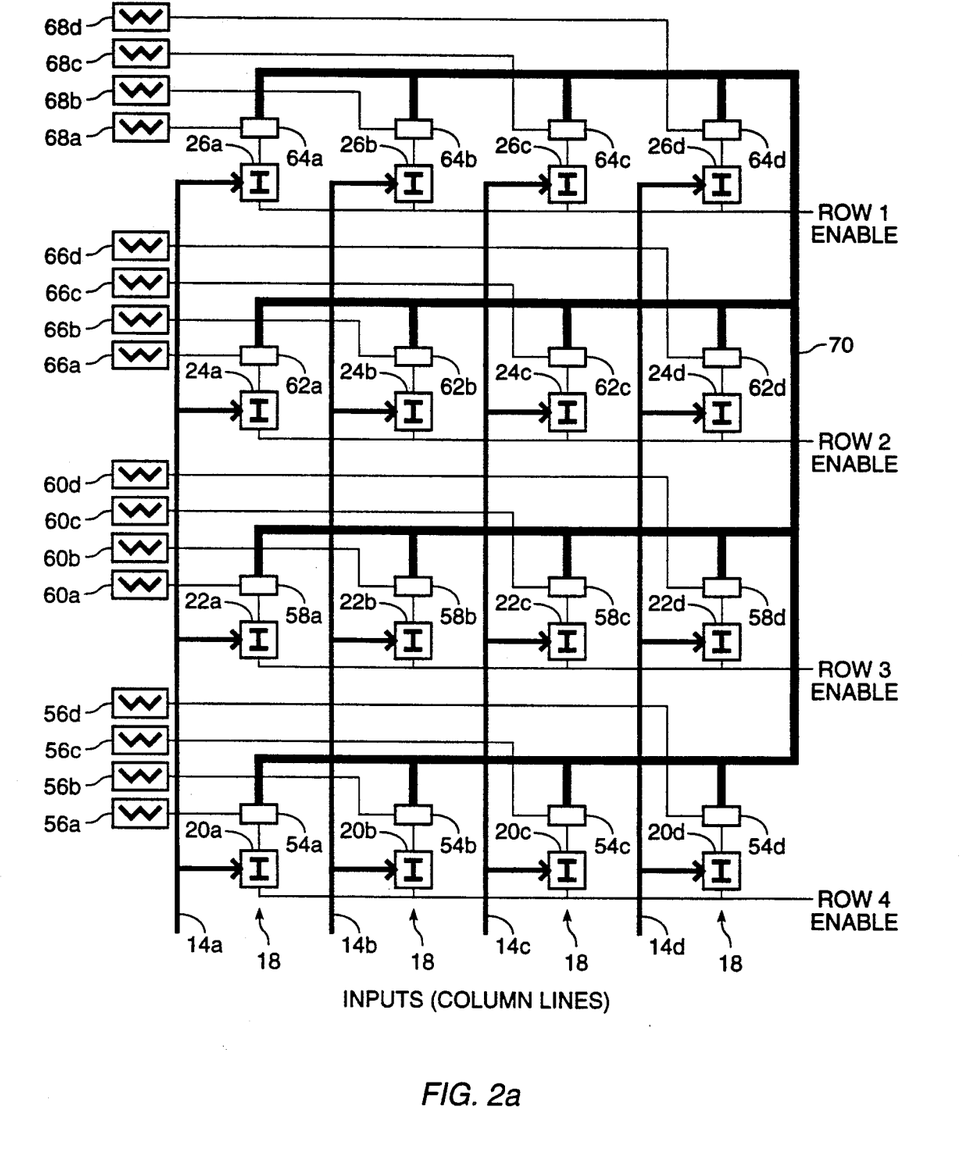
FIG. 2a is a block diagram of a plurality of multi-stage rotating buffers and associated processing circuitry according to a presently preferred embodiment of the invention.

Referring now to FIG. 2a, multi-stage buffers 18 associated with column lines 14a, 14b, 14c, and 14d are each shown as having four stages, 20a–d, 22a–d, 24a–d, and 26a–d, each of which is an analog latch, including an input, an output, and an enable input. Each analog latch may be configured from a conventional sample/-hold circuit or from a similar circuit.

Figure 2B:
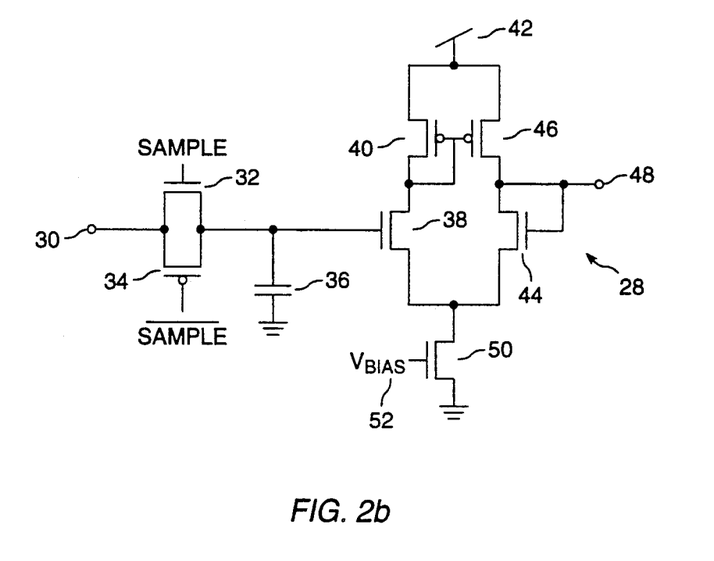
FIG. 2b is a schematic diagram of a presently preferred analog latch which may be employed in the present invention.

In a presently preferred embodiment of the present invention, an analog latch may be configured from the circuit shown in FIG. 2b. Referring now to FIG. 2b, an analog latch 28 according to the present invention includes an input node 30 connected to the input of a conventional CMOS pass gate including N-channel MOS transistor 32 and P-channel MOS transistor 34. The gates of pass gate transistors 32 and 34 are connected to complementary Sample signals as shown in FIG. 2b.

The output of the pass gate is connected to one plate of a capacitor 36 and to the gate of a first N-channel MOS transistor 38. The other plate of capacitor 36 is connected to a fixed voltage source. The drain of first N-channel MOS transistor 38 is connected to the drain and gate of a first P-channel MOS transistor 40. The source of first P-channel MOS transistor 40 is connected to a source of positive voltage 42.

A second N-channel MOS transistor 44 has its source connected to the source of first N-channel MOS transistor 38 and its gate and drain connected to the drain of second P-channel MOS transistor 46 and to an output node 48. The gate of second P-channel MOS transistor 46 is connected to the gate of first P-channel MOS transistor 40 and its source is connected to the source of positive voltage 42.

The sources of first and second N-channel MOS transistors are commonly connected to the drain of a third N-channel MOS transistor 50 having its source connected to a source of negative voltage shown as ground. As will be appreciated by those of ordinary skill in the art, the gate of third N-channel MOS transistor 52, which acts as a current source, is connected to a source of bias voltage shown at reference numeral 52.

Referring again to FIG. 2, in one embodiment of the present invention, the analog value of the signal presented to the input of each analog latch 20a–d, 22a–d, 24a–d, and 26a–d on column lines 14a–d, respectively, will be captured and appear at the output of the analog latches in a particular row, in response to a signal on their enable inputs. Those of ordinary skill in the art will recognize that a four stage deep embodiment is merely illustrative and that the number of stages to be used will be a matter of design choice.

First stages 20a–d have their inputs connected to column lines 14a–d, respectively and their outputs connected to first inputs of function circuits 54a–d. The second inputs of function circuits 54a–d are each connected to a weighting value, shown symbolically at reference numerals 56a–d. The function of the weighting values 56a–d is to provide a weight term for use in processing signals from the array. For instance, in a visual pattern recognition implementation, the weights may represent a stored pattern with which the input analog data is to be compared.

Those of ordinary skill in the art will readily recognize that a wide variety of meanings may be assigned to the weighting values dependent on the particular application to which the circuit of the present invention is put. Additionally, those of ordinary skill in the art will recognize that there will be applications for which the weighting function is not necessary, such as a two dimensional box filter, and in such applications the function circuits may be unary functions of the latched input values. In other applications, two or more weights may be required for each function circuit.

Second stages 22a-d have their inputs connected to column lines 14a-d and their outputs connected to a first input of function circuits 58a-d. The second inputs of function circuits 58a-d are connected to weighting values shown symbolically at reference numerals 60a-d. In similar fashion, third stages 24a-d, and fourth stages 26a-d are shown having their inputs commonly connected to column lines 14a-d and their outputs connected to first inputs of function circuits 62a-d and 64a-d. The second inputs of function circuits 62a-d and 64a-d are connected to weighting values 66a-d and 68a-d.

In the general case, function circuits 54a-d, 58a-d, 62a-d, and 64a-d are the signal processing circuits and may perform the function $f(w_i, x_i)$. The simple case is the multiplicative case where $f(w_i, x_i) = (w_i \cdot x_i)$. Other examples of functional circuits include, but are not limited to, various types of multipliers, such as a Gilbert multiplier, as disclosed in the book Analog VLSI and Neural Systems, by Carver Mead, Addison-Wesley Pub. Co. 1989, at p.92. This book is expressly incorporated by reference herein. Other functions will readily suggest themselves to those of ordinary skill in the art.

Numerous circuits are available for performing the signal processing function according to the present invention. The particular circuit chosen will depend on the desired result. For example, such circuits include transconductance amplifiers such as those disclosed in co-pending application Ser No. 230,459 now abandoned with the weight term applied to the bias input, the analog value applied to the non-inverting input and a reference applied to the inverting input. Such a circuit performs the function:

$$I_{out} = e^{V_{weight}} \cdot \tanh(V_{in} - V_{ref})$$

Alternatively, if the inverting input of the transconductance amplifier is connected to a common output line to which a number of such transconductance amplifier outputs are connected, the output line will be driven to a voltage representing the weighted mean for small spread of $V_{in}$ values and a weighted median for large spread of $V_{in}$ values. Such a circuit configuration is described in the book Analog VLSI and Neural Systems, at pp. 105-106.

A variation of signal processing circuits utilizes two MOS transistors connected in series between a common output line and a fixed voltage, such as ground. A voltage representing the analog data signal input is supplied to the gate of one of the MOS transistors and a voltage representing the weight term is supplied to the gate of the other MOS transistor. If the voltages are the logarithm of an analog value $X_{in}$ and the logarithm of a weight value $Y_{wt}$, the circuit performs the function:

$$I_{out} = X_{in} \cdot Y_{wt} / (X_{in} + Y_{wt})$$

The circuits described above may be generally thought of as performing a generalized multiply function, and the word "multiplying", as used herein in the specification and claims, may be thought of as encompassing the functions performed by these circuits.

According to another alternative embodiment, the signal processing circuits could be made to be adaptable, such as by use of the adaptable structures disclosed in co-pending applications Ser. Nos. 230,459 now abandoned and 525,764, U.S. Pat. No. 5,059,920 filed May 18, 1990, also expressly incorporated herein by reference. In such cases, the individual function circuits could be assigned their own individual weights. Such an embodiment would be useful for recognition of more than one feature in an input set of data.

In a presently preferred embodiment, the outputs of function circuits 54a-d, 58a-d, 62a-d, and 64a-d are added together to produce a result term which appears on common output conductor 70. If function circuits 54a-d, 58a-d, 62a-d, and 64a-d are constructed such that each of their outputs is in the form of an electrical current, the currents may be easily summed on a common output conductor 70. This property will be advantageous when the present invention is used to fabricate a dense analog array processor on a monolithic integrated circuit.

From this disclosure, those of ordinary skill in the art will recognize that the voltage value stored in each latch is used as the input to more than one processing circuit. For this reason, it is preferable to store each value only once, since a transfer of the value to a separate location by traditional analog shifting technology such as CCD or Bucket-Brigade Device will inevitably result in the degradation of the stored value due to the capacitive loading of the storage location by the inherent capacitance of the processing elements connected thereto. The solution to this problem employed in the preferred embodiment of the invention is to store each data sample once in an analog latch in the multi-stage buffer which most recently contained the oldest sample value, and to re-associate the weights used with each element to correspond to the new row assignment of that element after each row of new data are stored.

The enable inputs of the four stages 20a-d, 22a-d, 24a-d, and 26a-d are driven by a source of control signals which enables only one row of the analog latches at a time in a predetermined order. For example, in a presently preferred embodiment, first analog quantities from transducers in a first row of the array are stored in stages 20a-d by enabling the latches associated with stages 20a-d. Next, second analog quantities from transducers in a second row in the array are stored in stages 22a-d by enabling the latches associated with stages 22a-d. Next, third analog quantities from transducers in a third row of the array are stored in stage 24 by enabling the latches associated with stages 24a-d. Next, fourth analog quantities from transducers in a fourth row in the array are stored in stage 26 by enabling the latches associated with stages 26a-d.

At this point in time, the buffer is full and the processing circuitry may perform a processing operation on the analog data stored therein. After completion of processing, the oldest analog data, that contained in stages 20a-d, may be overwritten with new data, representing a new row scanned from the array, and the processing circuitry may perform a processing operation on the analog data. Next, the data in stages 22a-d will be replaced, followed by processing of the data contained in the multi-stage buffer. Next the data in stages 24a-d will be replaced, followed by processing of the data contained in the multi-stage buffer. Next, the data in stages 26a-d will be replaced, followed by processing of the data contained in the multi-stage buffer.

Before processing the data after each successive data reload, however, provision must be made to re-associate the correct weighting values with the analog data, which has appeared to rotate with respect to the weight values. Weight rotation may be easily accomplished by means of analog switches in a manner well understood by those of ordinary skill in the art.

In the visual pattern recognition example referred to above, it can be seen that without associating the weight values to the analog data present in the multi-stage buffer, the rows of input image pixels will be displaced with respect to the weight value of rows of reference pixels in the image with which it is being compared, causing an incorrect association to be made. In a presently preferred embodiment, the re-association of the weighting may be accomplished by a transistor switch matrix as is well known in the art.

Figure 3A:
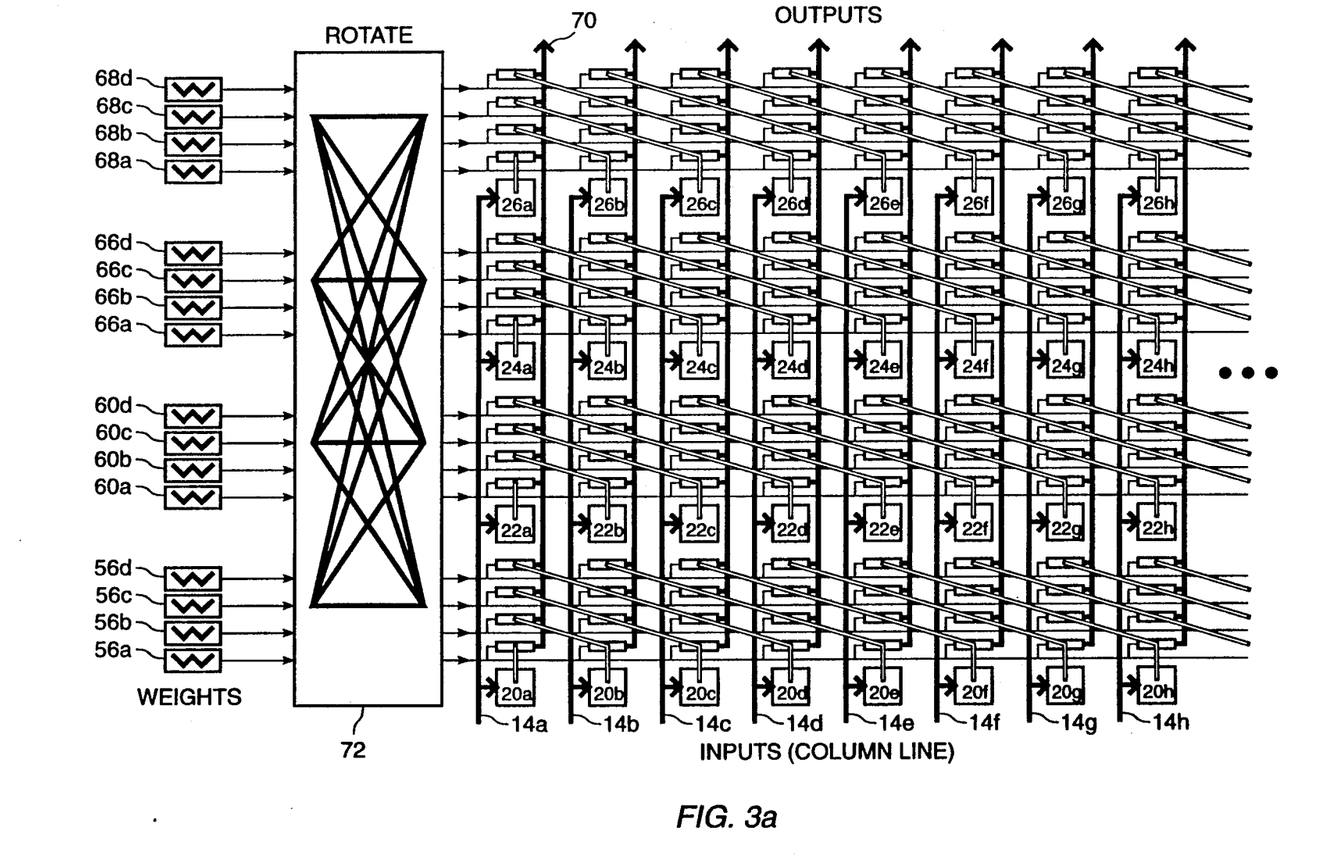
FIG. 3a is a block diagram showing circuitry for simultaneously performing neighborhood processing on a plurality of neighborhoods in a slice of data from an analog array.

Referring now to FIG. 3a, circuitry for processing data from a "slice" of the array four rows deep and eight columns wide is shown in block diagram form in which the locations of the blocks in the diagram correspond to the physical layout of the circuit blocks in an integrated circuit. The circuitry shown in block form in FIG. 3a can simultaneously process data from a series of overlapping 4×4 neighborhoods, each neighborhood shifted over one column from the adjacent 4×4 neighborhood. Thus the first neighborhood encompasses information from columns 14a-d in the array, the second encompasses information from columns 14b-e, the third encompasses information from columns 14c-f, etc. Those of ordinary skill in the art will recognize that this embodiment is merely illustrative and that design considerations will dictate the size of the slice processing circuitry which may be fabricated according to the principles of the present invention.

In the embodiment of FIG. 3a, analog latches 20a-h, 22a-h, 24a-h, and 26a-h hold data from a slice of the array four rows deep and eight columns wide. Located in the spaces adjacent to each analog latch are a number of function circuits corresponding to the number of columns of data in a neighborhood which is to be simultaneously processed. In the embodiment of FIG. 3a, these 4 function circuits are shown disposed above each analog latch. In a presently preferred embodiment, the function circuits and the latch circuits are shown laid out in a matrix. Such a layout permits a high density of functionality and greatly simplifies the interconnect wiring scheme required to produce a functioning integrated circuit with acceptable yields.

In the exemplary embodiment disclosed with respect to FIG. 3a, the data in any given 4×4 "neighborhood" may be simultaneously processed and all neighborhoods contained in the presently stored rows of the data may be processed simultaneously. Those of ordinary skill in the art will recognize that the processing time for an entire row is limited only by the settling time of the analog values in the various circuit elements, so the throughput of the processing circuitry of the present invention is essentially independant of the size of the neighborhood.

An important aspect of the present invention which allows the high degree of parallelism achieved by the invention is the layout of the analog latches and the function circuits which allow a relatively simple interconnect wiring scheme which may be implemented using state of the art fabrication techniques. As can be seen from FIG. 3a, the four function circuits located above analog latch 20a have their inputs connected to analog latches 20a, 20b, 20c, and 20d, respectively. Similarly, the four function circuits located above analog latch 22a have their inputs connected to analog latches 22a, 22b, 22c, and 22d, respectively, and, in like fashion, the four function circuits located above analog latch 24a have their inputs connected to analog latches 24a, 24b, 24c, and 24d, respectively and the four function circuits located above analog latch 26a have their inputs connected to analog latches 26a, 26b, 26c, and 26d, respectively. Thus, the entire circuit of FIG. 2a may be layed out in a circuit column with the output current summing conductor 70 layed out as a relatively straight conductor member. Those of ordinary skill in the art will appreciate that this architecture allows expanding the neighborhood size merely by increasing the number of function circuits and analog latches in the circuit columns, and by providing a larger number of weights.

Further examination of FIG. 3a reveals that, according to another aspect of the present invention, the remainder of the circuit consists of similarly layed out circuit columns having output summing conductors layed out as parallel lines. By laying out the conductors connecting the outputs of the analog latch circuits to the inputs of the function circuits a diagonal lines to which connections are made using conventional fabrication technology, it can be seen that successive columns of analog latches and function circuits permit the processing of data in adjacent 4×4 neighborhoods. In the embodiment of FIG. 3a, the first circuit column containing analog latch circuits 20a, 22a, 24a, and 26a with four function circuits interposed above each analog latch processes the 4×4 neighborhood comprising analog latch circuits 20a-d, 22a-d, 24a-d, and 26a-d. The second circuit column containing analog latch circuits 20b, 22b, 24b, and 26b with four function circuits interposed above each analog latch processes the 4×4 neighborhood comprising analog latch circuits 20b-e, 22b-e, 24b-e, and 26b-e. The third circuit column containing analog latch circuits 20c, 22c, 24c, and 26c with four function circuits interposed above each analog latch processes the 4×4 neighborhood comprising analog latch circuits 20c-f, 22c-f, 24c-f, and 26c-f. The fourth circuit column containing analog latch circuits 20d, 22d, 24d, and 26d with four function circuits interposed above each analog latch processes the 4×4 neighborhood comprising analog latch circuits 20d-g, 22d-g, 24d-g, and 26d-g. The fifth circuit column containing analog latch circuits 20e, 22e, 24e, and 26e with four function circuits interposed above each analog latch processes the 4×4 neighborhood comprising analog latch circuits 20e-h, 22e-h, 24e-h, and 26e-h. The sixth circuit column containing analog latch circuits 20f, 22f, 24f, and 26f with four function circuits interposed above each analog latch processes the 4×4 neighborhood comprising analog latch circuits 20f-i, 22f-i, 24f-i, and 26f-i. The seventh circuit column containing analog latch circuits 20g, 22g, 24g, and 26g with four function circuits interposed above each analog latch processes the 4×4 neighborhood comprising analog latch circuits 20g-j, 22g-j, 24g-j, and 26g-j. The eighth circuit column containing analog latch circuits 20h, 22h, 24h, and 26h with four function circuits interposed above each analog latch processes the 4×4 neighborhood comprising analog latch circuits 20h-k, 22h-k, 24h-k, and 26h-k (latch circuits having subscripts i-k are not shown in FIG. 3a and should be assumed to exist in a continuation of the figure extending to the right).

Like the embodiment of FIG. 2a, the weight circuits for the embodiment disclosed in FIG. 3a are sixteen in number. As in the embodiment of FIGS. 2a, these weight circuits must be re-associated with the input data as the latches constituting the multistage buffers are reloaded with new analog data from the array. These sixteen weight circuits may be conceptually layed out in groups of four, each group representing a neighborhood-wide row to be processed. As the latches are reloaded, a new group of four weight circuits is assigned to represent each row position for processing. The outputs of the weight circuits are connected to inputs of weight rotate circuit 72. Because of the matrix type layout of the function circuits, the output lines of weight rotate circuit 72 may be layed out as straight lines to connect with the function circuits via conventional fabrication technology.

Figure 4:
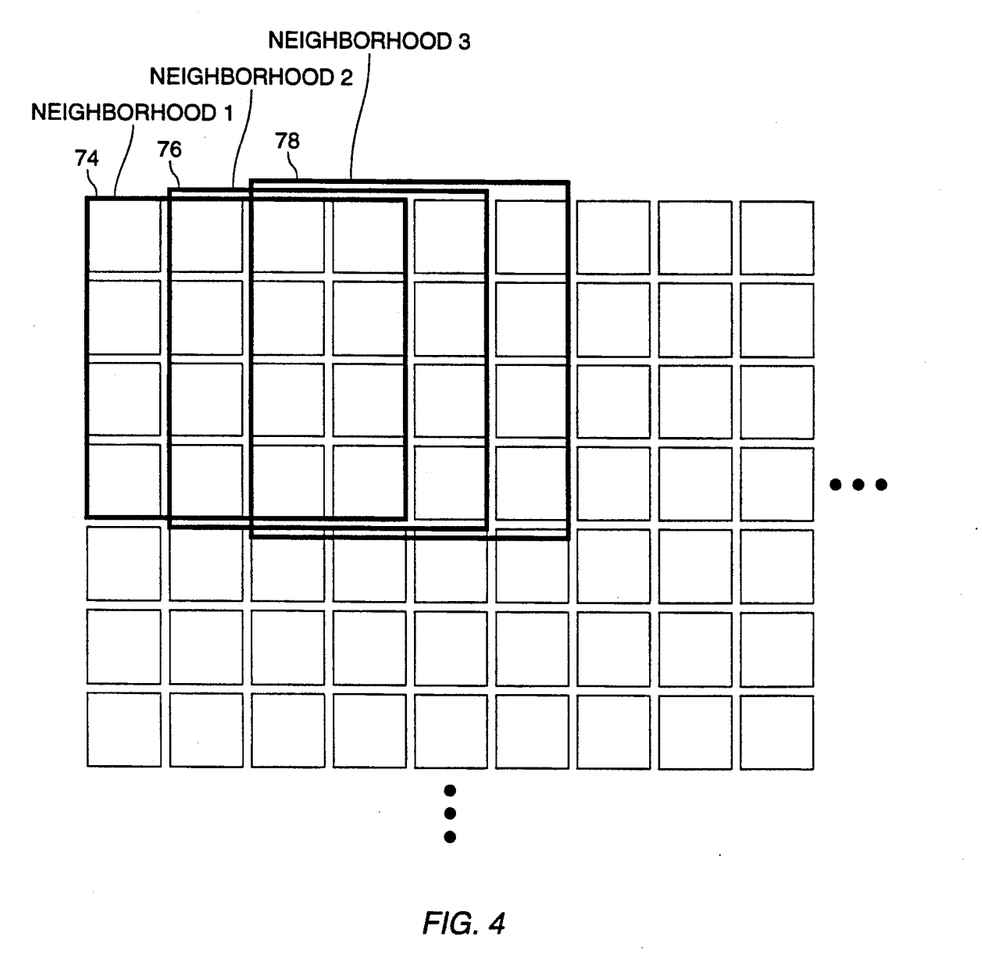

FIG. 4 schematically shows adjacent overlapping neighborhoods of the array which may be processed utilizing the circuit of FIG. 3a. First neighborhood 74 is processed by the circuitry in the first circuit column containing analog latches 20a, 22a, 24a, and 26a. Second neighborhood 76 is processed by the circuitry in the first circuit column containing analog latches 20b, 22b, 24b, and 26b. Third neighborhood 78 is processed by the circuitry in the first circuit column containing analog latches 20o, 22o, 24c, and 26c and so on.

Figure 3B:
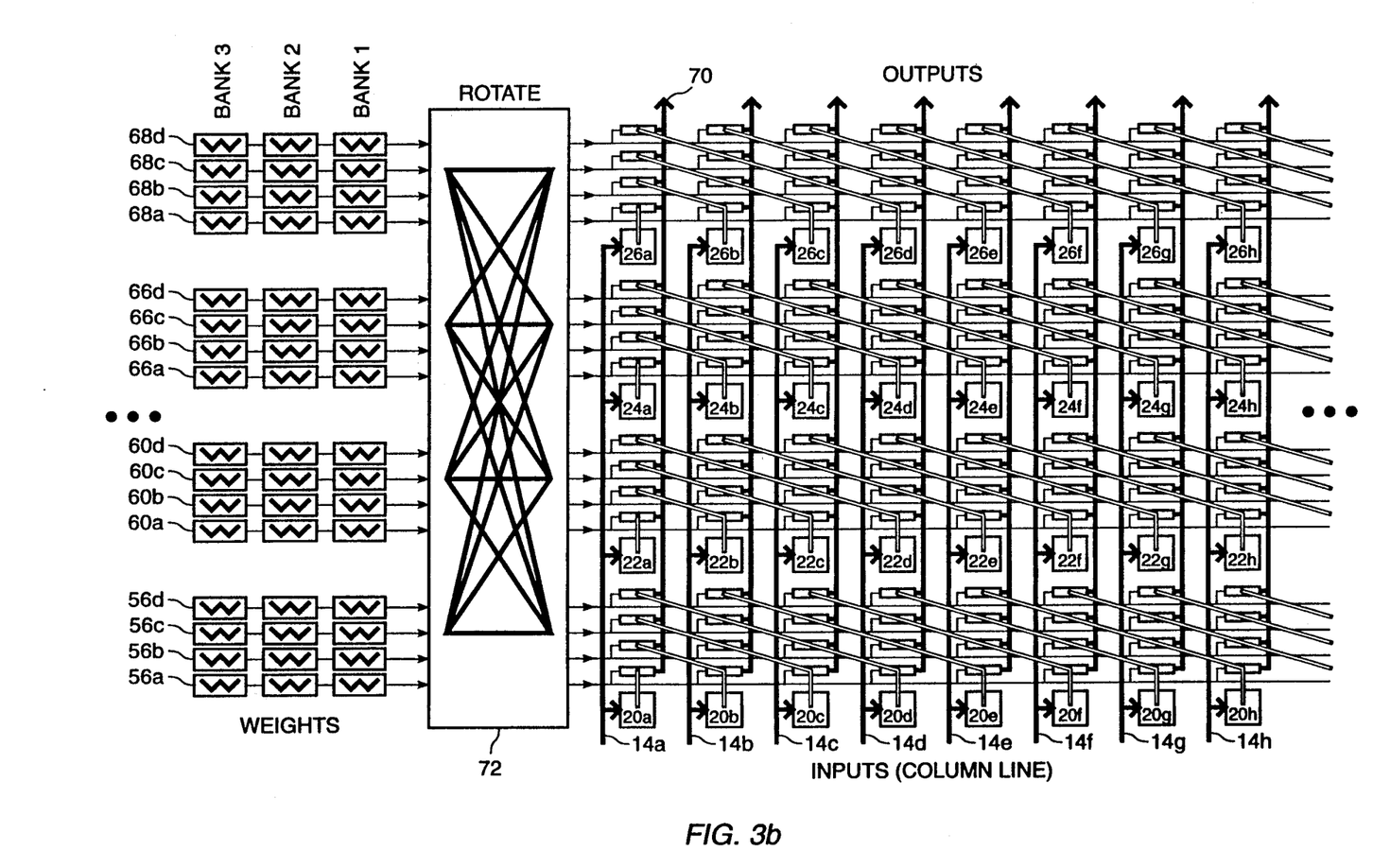
FIG. 3b is a block diagram showing circuitry for simultaneously performing neighborhood processing on a plurality of neighborhoods in a slice of data from an analog array, including three selectable banks of sources of weighting information.

Another aspect of the present invention may be understood with reference to FIG. 3b. The architecture of the present invention allows the entire line time for the outputs of the computation to settle. For example, if the input data are derived from a standard video camera, the elapsed time between lines is approximately 32 microseconds. The settling time of a typical analog output can range from 1 to 4 microseconds. For this reason, it is possible to perform more than one computation on the data stored in the analog latches before a new row of data is loaded in. The alternate computations are defined by a plurality of banks of weighting values in place of the single bank of weighting values shown in FIG. 3a. Once a new row of input data has been latched, the vector of output values is computed using one set of weighting values. These outputs are sent on to the next stage of processing, and then a second bank of weighting values is selected. Once the output vector of this second computation has settled, the result can be passed on and yet a third set of weighting values can be selected. Using the typical settling times mentioned above, up to 8 sets of weighting values can be applied to each neighborhood, and 8 separate computations performed, without slowing down the video rate. The cost of this additional capability is merely the additional sources of weighting values, and the associated weight-selection circuitry, rather than duplicating the entire processor of FIG. 3a 8 times.

Figure 5A:
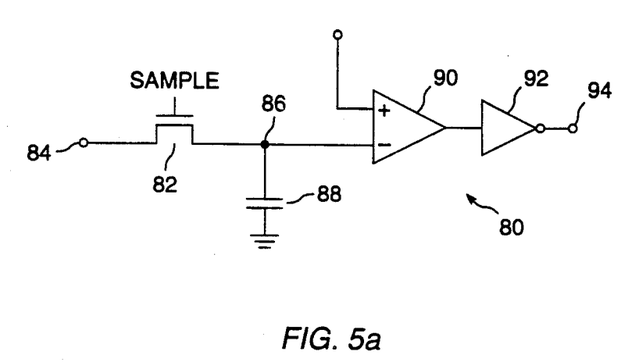
FIG. 5a is a schematic diagram of a voltage to pulse width converter circuit useful for application in the present invention.
Figure 5B:
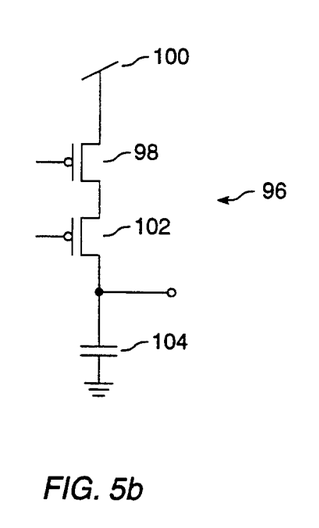

In an alternate embodiment of the present invention, disclosed with reference to FIGS. 5a and 5b, the latch circuits which produce an output voltage proportional to the input voltage are replaced by circuits which produce at their outputs a pulse having a width proportional to the magnitude of the input voltage. A presently preferred circuit for producing such an output is shown in FIG. 5a.

Referring now to FIG. 5a, voltage to pulse width converter circuit 80 includes a pass transistor 82 connected between an input node 84 and a node 86 to which is connected one plate of a capacitor 88. The gate of pass transistor 82 is connected to a SAMPLE signal. The other plate of capacitor 88 is connected to a fixed voltage, shown as ground in FIG. 5a. The inverting input of a comparator 90 is connected to node 86. The non-inverting input of comparator 90 is connected to a signal source which produces a triangular waveform shown diagrammatically in FIG. 5a. In a presently preferred embodiment, the triangular waveform starts at zero volts, increases linearly to a positive voltage value chosen to approximate the highest expected voltage to be stored on capacitor 88, and then decreases to zero at the same slope as the increase. In a presently preferred embodiment, the slope of the triangular wave is chosen to produce an output pulse width varying from about zero to about 10 $\mu$sec in duration. Those of ordinary skill in the art will readily understand how to produce such a waveform. Those of ordinary skill will also realize that non-linear waveforms may be used in place of a triangular or other linear waveform. Such non-linear waveforms will perform a monotonic function mapping of the input prior to multiplication with the weight. For example, dynamic range compression of the input signal may be accomplished in this manner by using an exponential waveform. The output of the comparator 90 is connected to the input of inverter 92, whose output is connected to output node 94.

The output of voltage to pulse width converter circuit 80 may be supplied to a function circuit such as the circuit shown in FIG. 5b. Referring now to FIG. 5b, a function circuit 96 useful in conjunction with the circuit of FIG. 5a includes a first P-channel MOS transistor 98, having its source connected to a source of positive voltage shown at reference numeral 100, and its drain connected to the source of a second P-channel transistor 102. The drain of second P-channel transistor 102 is connected to one plate of a capacitor 104. The other plate of capacitor 104 is connected to a source of fixed voltage shown as ground in FIG. 5b. The gates of P-channel transistors 98 and 102 are connected to the output of the Circuit of FIG. 5a and a weight term, respectively.

The circuit of FIG. 5b charges the capacitor 104 with a current determined by the weight term for the period defined by the width of the output pulse of the circuit of FIG. 5a. If the capacitor 104 is precharged to a known voltage, i.e., ground, by known methods, then the product of the latched analog quantity and the weight value is the difference in voltage on capacitor 104 between the voltage to which the capacitor was precharged and the voltage on the capacitor after the end of the pulse from the circuit of FIG. 5a.

A distinct advantage of the embodiment of FIGS. 5a and 5b is that the function circuit occupies a very small layout area on an integrated circuit. This allows the integration of a large amount of functionality in a small silicon area.

One advantage of the present invention is that it utilizes the fact that the information contained within the processing plane needs to be scanned out of the processing plane in any event. Thus the present invention avoids any additional processing overhead by utilizing an already existing process as a portion of the information processing sequence. In addition, the present invention includes employment of an integrated circuit layout scheme which provides a high degree of parallelism and a high density of functionality with a manageable chip plan.

The circuitry performing the operation on the information in the processing plane is located outside of the processing plane, thus avoiding the extra complexity which would otherwise be required if the operating circuitry had to be superimposed onto the processing plane itself. The circuitry for performing the operations may take many forms, dependant largely on the particular application and operation to be performed.

While various embodiments and applications of this invention i have been shown and described, it would be apparent to those skilled in the art that many more modifications are possible without departing form the inventive concepts herein. The invention, therefore, is not to be restricted except in the spirit of the appended claims.

What is claimed is:

1. Apparatus for performing operations on analog data obtained from a portion of a processing plane, said portion organizable into N rows, where N is an integer greater than one, and M columns, where M is an integer greater than one, said rows and columns forming intersections, said processing plane having information elements at the intersections of selected ones of said rows and columns, said apparatus including:

storage means for temporarily storing analog data from information elements at M columns and n contiguous rows of said processing plane, where $1 < n < N$, said rows identifiable by n successive integers between 1 and N, to form a $n \times M$ operation plane, $n \times m$ sources of weighting information, associated with a process to be performed on a neighborhood of said processing plane, said neighborhood comprising a plurality of elements arranged as a local subset of n rows and m columns of said processing plane, where $1 < m < M$, said sources of weighting information mapped with a one to one correspondence to the elements of said neighborhood, combining means for simultaneously combining said $n \times m$ sources of weighting information with selected $n \times m$ neighborhoods of said $n \times M$ operation plane, said combining means adapted to associate said sources of weighting information with said analog data such that the row order of the weighting information corresponds to the row order of the analog data and the same weight is used for the same relative position within each of said neighborhoods.

2. The apparatus of claim 1 wherein said selected $n \times m$ neighborhoods are all possible contiguous neighborhoods.

3. The apparatus of claim 1 wherein said neighborhood comprises a plurality of elements arranged as a local subject of n contiguous rows and a m contiguous columns of said processing plane.

4. The apparatus of claim 1 wherein said combining means includes means for multiplying said analog data by said weighting information.

5. Apparatus for performing operations on analog data obtained from a vector of M analog input signals, where M is an integer greater than one, including:

$n \times M$ storage elements for temporarily storing analog data, said elements arranged in n rows of M columns each to form an operating plane, each row representing a separate time sample of said input vector, $n \times m$ sources of weighting information, associated with a process to be performed on a plurality of neighborhoods of said operating plane, each of said neighborhoods comprising a plurality of elements arranged as a local subset of n rows and m columns of said operating plane, were $1 < m < M$, said sources of weighting information mapped with a one to one correspondence to the elements of said neighborhood, combining means for simultaneously combining said $n \times m$ sources of weighting information with selected $n \times m$ neighborhoods of said $n \times M$ operating plane, said combining means adapted to combine said sources of weighting information with said analog data such that the row order of the weighting information corresponds to the row order of the analog data and to combine the same source of weighting information with the analog data in the same relative position within each of said neighborhoods.

6. The apparatus of claim 5 wherein said selected $n \times m$ neighborhoods are all possible contiguous neighborhoods.

7. The apparatus of claim 5 wherein said neighborhood comprises a plurality of elements arranged as a local subset of n contiguous rows and m contiguous columns of said processing plane.

8. The apparatus of claim 5 wherein said combining means includes means for multiplying said analog data by said weighting information.

9. Apparatus for performing operations on analog data obtained from a vector of M analog input signals, where M is an integer greater than one, including:

$n \times M$ storage elements for temporarily storing analog data, said elements arranged in n rows of M columns each to form an operating plane, each row representing a separate time sample of said input vector, said rows identifiable by n successive integers, the order of said integers indicating the relative time at which said data are sampled, means for selectively storing each new sample of said input vector in the row of said storage elements which si presently storing the oldest one of said samples, $n \times m$ sources of weighting information, associated with a process to be performed on a neighborhood of said operating plane, said neighborhood comprising a plurality of elements arranged as a local subset of n rows and m columns of said operating plane, where $1 < m < M$, each said source of weighting information identifiable by a row and column position within said neighborhood with which it will be used, combining means for simultaneously combining said $n \times m$ sources of weighting information with the analog data in selected $n \times m$ neighborhoods of said $n \times M$ operating plane, said combining means adapted to combine each of said $n \times m$ sources of weighting information with the analog data in the corresponding row and column position within each of said neighborhoods.

means, responsive to the storage of each new sample and cooperating with said combining means, for associating said sources of weighting information with said analog data in said combining means such that the row order of the weighting information corresponds to the row order of the analog data.

10. The apparatus of claim 9 Wherein said selected n×m neighborhoods are all possible contiguous neighborhoods.

11. The apparatus of claim 9 wherein said neighborhood comprises a plurality of elements arranged as a local subset of n contiguous rows and m contiguous columns of said processing plane.

12. The apparatus of claim 9 wherein said combining means includes means for multiplying said analog data by said weighting information.

13. Apparatus for performing operations on analog data obtained from a vector of M analog input signals, where M is an integer greater than one, including:

n×m storage elements for temporarily storing analog data, said elements arranged in n rows of M columns each to form an operating plane, each row representing a separate time sample of said input vector, said rows identifiable by successive integers between 1 and n, the order of said successive integers indicating the relative time at which said data are sampled, means for selectively storing each new sample of said input vector in the row of said storage elements which is presently storing the oldest one of said samples, n×m sources of weighting information, associated with a process to be performed on a neighborhood of said operating plane, said neighborhood comprising a plurality of elements arranged as a local subset of n rows and m columns of said operating plane, where 1<m<M, each said source of weighting information identifiable by a row and column position within said neighborhood with which it will be used, said row positions being identifiable in order by successive integers between 1 and n, a set of m processing elements associated with each of said storage elements, each of said processing elements having a first input connected to the output of one of said storage elements in the same row as the storage element with which it is associated, a second input connected to the source of weighting information corresponding to the row and column location within the neighborhood computed by said processing element, and an output, means, responsive to the storage of each new sample, for re-associating said sources of weighting information with said processing elements such that the order of the successive integers identifying the rows of storage elements and the order of the successive integers identifying the rows of said sources of weighting information connected to the first and second inputs of said processing elements match, means for combining the outputs of all members of all sets of m processing elements within each column in said operating plane.

14. The apparatus of claim 13 wherein the outputs of said processing elements are currents, and said means for combining the outputs of said processing elements is a wire connected to the outputs of all n×m processors associated with each neighborhood.

15. The apparatus of claim 13 wherein each of said processing elements comprises a transconductance amplifier having a non-inverting input, an inverting input, a bias input, and an output, said non-inverting input being said first input, said inverting input being connected to said output, and said bias input being said second input, and wherein said means for combining is a conductor connected to the output of all said transconductance amplifiers associated with a given neighborhood.

16. The apparatus of claim 13 wherein each of said processing elements comprises a transconductance amplifier having a non-inverting input, an inverting input, a bias input, and an output, said non-inverting input being said first input, said inverting input being connected to a source of reference voltage, and said bias input being said second input, and wherein said means for combining is a conductor connected to the output of all said transconductance amplifiers associated with a given neighborhood.

17. The apparatus of claim 13 wherein each of said processing elements comprises a first and a second MOS transistor, said first MOS transistor having its drain connected to a conductor, its source connected to the drain of said second MOS transistor and the source of said second MOS transistor connected to a source of fixed voltage, the gate of said first MOS transistor acting as said first input, the gate of said second MOS transistor serving as said second input and wherein said means for combining is said conductor connected to the drains of all said first MOS transistors associated with a given neighborhood.

18. A parallel process for computing a neighborhood operation on an input vector of analog voltages, said process including the steps of:

temporarily storing analog data from said input vector in storage elements arranged in n rows of M columns each, where n and M are integers greater than 1, to form an operating plane, each row representing a separate time sample of said input vector, said rows identifiable by successive integers indicating the relative time at which said data are sampled, selectively storing each new sample of said input vector in the row of said storage elements which is presently storing the oldest one of said samples, providing n×m sources of weighting information, where m is an integer greater than one, associated with a process to be performed on a set of neighborhoods of said operating plane, each neighborhood in said set comprising a plurality of elements arranged as a local subset of n rows and m columns of said operating plane, where 1<m<M, each said source of weighting information identifiable by a row and column position within said neighborhood with which it will be used, said row positions being identifiable in order by successive integers between 1 and n, re-associating said weighting information with said analog data after the storage of each new ample in a manner so as to match the order of the successive integers identifying the rows of storage elements and the order of the successive integers identifying the rows of said sources of weighting information, simultaneously combining each source of weighting information with the corresponding element of stored data within each of said neighborhoods to form a set of intermediate values, simultaneously combining said intermediate values associated with each of said neighborhoods to form a set of final outputs, one such output for each neighborhood.

19. A parallel process for computing a neighborhood operation on an input vector of analog voltages, said process including the steps of:

temporarily storing analog data from said input vector in capacitive storage elements arranged in n rows of M columns each, to form an operating plane, each row representing a separate time sample of said input vector, selectively storing each new sample of said input vector in the row of said storage elements which si presently storing the oldest one of said samples, providing n×m sources of voltage representing weighting information associated with a computation to be performed on a set of neighborhoods of said operating plane, each neighborhood in said set comprising a plurality of said storage elements arranged as a local subset of n rows and m columns of said operating plane, where $1 < m < M$, each said source of weighting information identifiable by a row and column position within said neighborhood with which it will be used, distributing the output of each said source of weighting information on a conductor passing along the row containing the processing elements with which it will be used, simultaneously combining in a plurality of processing elements each source of weighting information with the corresponding element of stored data within each of said neighborhoods to form an output current, simultaneously summing the output currents associated with all processing elements of each said neighborhoods to form a set of final output currents, one such output current for each neighborhood.

* * * * *